(12) United States Patent
Tamaoka

(10) Patent No.: US 7,626,305 B2
(45) Date of Patent: Dec. 1, 2009

(54) ARMATURE, MOTOR USING THE ARMATURE, AND DISK DRIVE DEVICE USING THE MOTOR

(75) Inventor: Takehito Tamaoka, Kyoto (JP)

(73) Assignee: Nidec Corporation, Kyoto (JP)

( * ) Notice: Subject to any disclaimer, the term of this patent is extended or adjusted under 35 U.S.C. 154(b) by 367 days.

(21) Appl. No.: 11/626,453

(22) Filed: Jan. 24, 2007

(65) Prior Publication Data
US 2007/0170805 A1 Jul. 26, 2007

(30) Foreign Application Priority Data
Jan. 25, 2006 (JP) .............................. 2006-015827

(51) Int. Cl.
*H02K 21/12* (2006.01)
*H02K 21/22* (2006.01)
*G11B 17/02* (2006.01)

(52) U.S. Cl. .............................. 310/216.054; 360/99.08

(58) Field of Classification Search .............. 310/67 R, 310/216–218, 216.034, 216.54–216.64, 216.074, 310/216.091–216.098, 216.111; 360/98.07, 360/99.04, 99.08, 99.11
See application file for complete search history.

(56) References Cited

U.S. PATENT DOCUMENTS

| 5,668,427 | A | 9/1997 | Morita |
| 5,798,583 | A | 8/1998 | Morita |
| 5,930,076 | A | 7/1999 | Morita |
| 6,759,784 | B1 | 7/2004 | Gustafson et al. |
| 7,190,549 | B2 * | 3/2007 | Byun et al. ............... 360/99.08 |
| 2004/0090701 | A1 | 5/2004 | Byun et al. |
| 2007/0013255 | A1 | 1/2007 | Wakitani et al. |

FOREIGN PATENT DOCUMENTS

| JP | 6-292332 A | 10/1994 |
| JP | 06-292332 A | 10/1994 |
| JP | 09019095 A * | 1/1997 |
| JP | 09-046938 A | 2/1997 |
| JP | 2004-166497 A | 6/2004 |
| JP | 2006-166637 A | 6/2006 |

* cited by examiner

*Primary Examiner*—Tran N Nguyen
(74) *Attorney, Agent, or Firm*—Keating & Bennett, LLP

(57) ABSTRACT

An armature core of an electric motor includes a core plate having a plurality of tooth portions arranged circumferentially about a center axis and extending in a radial direction, and a supporting ring portion supporting the plurality of the tooth portions along outer circumferential surfaces thereof. Each tooth portion includes a wire-wound portion on which a coil is arranged, a tip portion at a radially innermost portion of each tooth portion, and an inclined connecting portion connecting the tip portion and the wire-wound portion. The connecting portion has a width in a circumferential direction greater than a width of the wire-wound portion but smaller than a width of the tip portion.

6 Claims, 20 Drawing Sheets

ARMATURE, MOTOR USING THE ARMATURE, AND DISK DRIVE DEVICE USING THE MOTOR

BACKGROUND OF THE INVENTION

1. Field of the Invention

The present invention generally relates to an armature core, an armature, an electronic motor having the armature, and a recording disk driving device using the motor. The present invention also relates to a method of manufacturing the armature used for the electronic motor.

2. Description of the Related Art

A recording disk drive such as a hard disk drive (HDD) is conventionally provided with a spindle motor for rotationally driving a recording disk. Such a spindle motor will be referred simply to as a "motor" hereinafter.

Recently, the HDD has been installed in portable devices such as a mobile music player, and the demand for an HDD having a small dimension is increasing.

The motor used for the HDD includes an armature core formed by laminating core plates. A core plate includes a plurality of teeth arranged to radially face a rotor magnet. Each of the teeth includes a wire-wound portion, around which a wire is wound, a tip portion facing toward the rotor magnet, and a connecting portion arranged between and magnetically connecting the wire-wound portion and the tip portion. The core plate is formed by pressing an electromagnetic steel plate, and during the pressing, the connecting portion is bent such that the wire-wound portion and the tip portion are arranged at axially different levels in an axial direction of the core plate. During the pressing, however, the thickness of the core plate at the connecting portion gets thinner and, thus, magnetic-flux saturates and core-loss increases at the connecting portion. Therefore, the rotation efficiency of the motor is degenerated.

SUMMARY OF THE INVENTION

In order to overcome the problems described above, preferred embodiments of the present invention provide an armature core in which flux saturation at connecting portions between tip portions and wire-wound portions of the teeth of the armature core is reduced even when the teeth are bent such that the tip portions facing toward a rotor magnet and wire-wound portions around which wires are wound (i.e., wire-wound portion) are arranged at different levels in an axial direction.

According to a preferred embodiment of the present invention, an armature core of an electric motor includes a core plate which includes a plurality of tooth portions arranged circumferentially about a center axis and extending in a radial direction, and a supporting ring portion supporting a plurality of the tooth portions along outer circumferential surfaces thereof. Each tooth portion includes a wire-wound portion on which a coil is arranged, a tip portion on a radially innermost portion of each tooth, and an inclined connecting portion arranged radially between the tip portion and the wire-wound portion. The connecting portion has a width in a circumferential direction greater than the width of the wire-wound portion but smaller than the width of the tip portion.

A thickness of the connecting portion is about 0.8 times or less of a thickness of the wire-wound portion. Moreover, the width of the connecting portion in the circumferential direction is about 1.2 times or more than the width of the wire-wound portion.

In the armature core in which the connecting portion is bent to arrange the wire-wound portion and the tip portion in axially different levels, the thickness of the connecting portion becomes thinner than other portions of the tooth. Since the magnetic flux saturates and is not converted into torque efficiently, efficiency of the motor is degenerated. In the present preferred embodiment of the present invention, the width of the connecting portion is expanded, and thus the magnetic flux saturation at the connecting portion is prevented.

According to another preferred embodiment of the present invention, the armature core is installed into the electric motor and the motor is used for a recording disk drive device. With the armature core according to the present preferred embodiment of the present invention, the electric motor and the recording disk drive device consume lower power and rotate more stably.

According to another preferred embodiment of the present invention, a method of manufacturing a core plate used for an armature core of an electronic motor is provided. The armature includes a plurality of teeth arranged circumferentially about a center axis and extend in a radial direction, a supporting ring supports the plurality of the teeth along outer circumferential surfaces thereof, and each of tooth includes a first wire-wound portion around which wire is wound, a first tip portion arranged radially innermost of each tooth, and a first connecting portion arranged radially therebetween and magnetically connecting the first wire-wound portion and the first tip portion. The method includes steps of arranging a plate-like core material substantially perpendicular relative to the center axis, forming a plurality of first bores in the core material along the circumferential direction centered about the center axis such that a width between each first bore at a preparatory connecting portion of the core material corresponding to the first connecting portion of the core plate is greater than a width between each first bore at a preparatory wire-wound portion of the core material corresponding to the first wire-wound portion of the core plate but smaller than a width between each first bore at a preparatory tip portion of the core material corresponding to the first tip portion of the core plate, pressing the core material to bend and draw the preparatory connecting portion of the core material such that the preparatory wire-wound portion and the preparatory tip portion of the core material are arranged at axially different positions from each other, forming a center bore centered about the center axis such that the first tip portion is formed from the core material, and cutting off a portion of the core material in a substantially circular shape radially outside of the first bores.

Other features, elements, steps, processes, characteristics and advantages of the present invention will become more apparent from the following detailed description of preferred embodiments of the present invention with reference to the attached drawings.

DETAILED DESCRIPTION OF THE PREFERRED EMBODIMENTS

Figure 1:
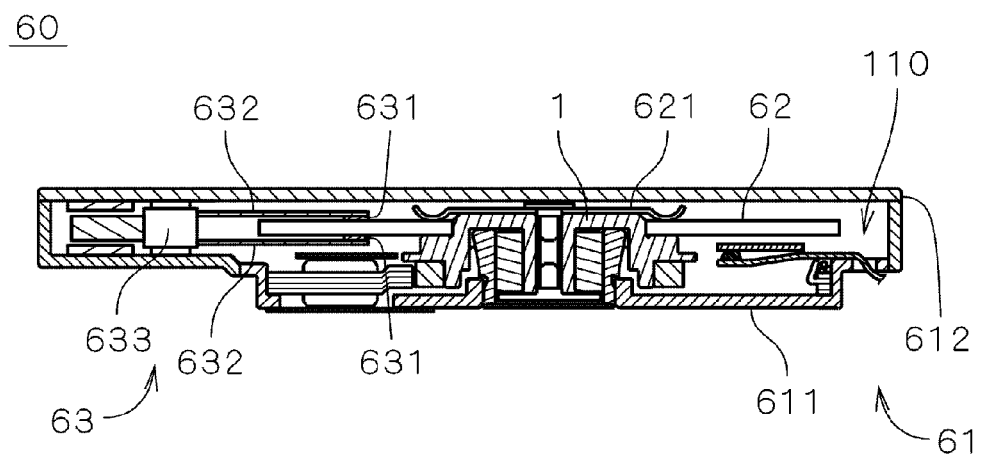
FIG. 1 is a diagram illustrating an internal configuration of a recording-disk drive device according to a preferred embodiment of the present invention.

FIG. 1 illustrates the internal configuration of a recording disk drive device 60 provided with an electrically powered spindle motor 1 (simply "motor 1" hereinafter) according to a preferred embodiment of the present invention. The recording-disk drive device 60 is a hard disk device and includes a recording disk 62 which stores information, an access unit 63 which writes information onto and (or) reads information from the recording disk 62, the motor 1 which retains and spins the recording disk 62, and a housing 61 which has an interior space 110 accommodating the recording disk 62, the access unit 63, and the motor 1.

As illustrated in FIG. 1, the housing 61 has an opening in the upper portion thereof, and is provided with a bottom first box housing component 611 to which the motor 1 and the access unit 63 are attached, and a plate-like second housing component 612 that by covering the opening in the first housing component 611 defines the interior space 110. In the recording disk drive device 60, the housing 61 is formed by joining the second housing component 612 to the first housing component 611, whereby the interior space 110 is a clean chamber where the presence of dust and debris is extremely low.

The recording disk 62 is set onto an upper surface of the motor 1 and fixed to the motor 1 by a clamp 621. The access unit 63 includes a head 631 that adjoins the recording disk 62 for magnetically writing information onto and reading information from the recording disk 62, an arm 632 that supports the head 631, and a head-shifting mechanism 633 that by moving the arms 632 varies the position of the head 631 relative to the recording disk 62. Through the configuration of these components, the head 631 accesses required positions on the spinning recording disk 62 when the heads have been brought adjacent to the recording disk 62 to conduct the reading and writing of information onto the recording disk.

Figure 2:
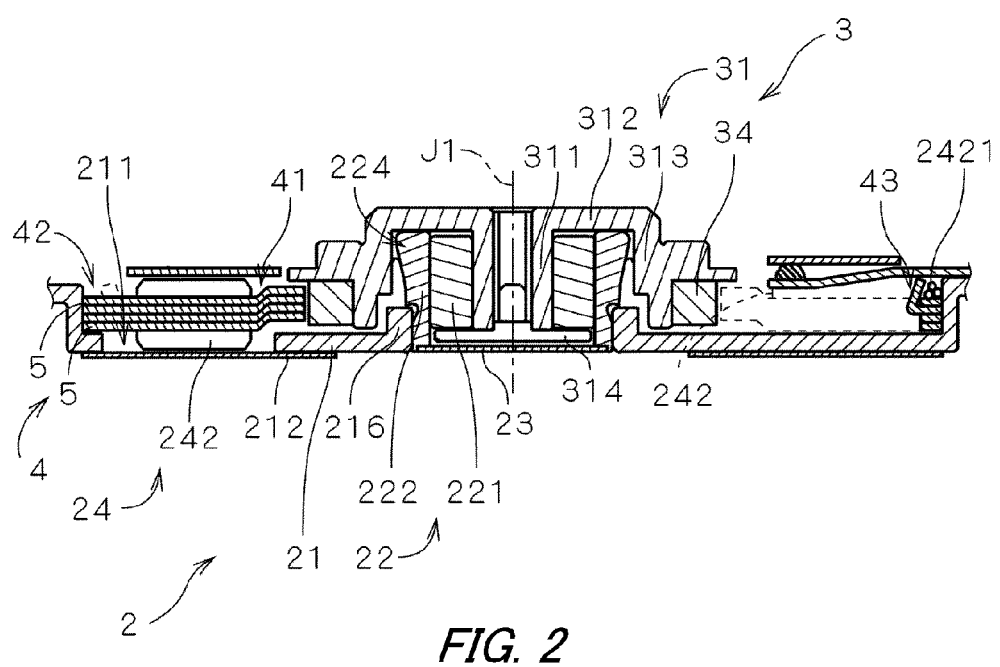
FIG. 2 is a vertical sectional view illustrating the configuration of a motor according to a preferred embodiment of the present invention.

FIG. 2 is a vertical sectional view illustrating the configuration of the motor 1 to rotatably drive the recording disk 62 (see FIG. 1). In the motor 1, the six coils 242 are connected in a star configuration (Y configuration) and the motor 1 is driven by a three phase AC power supply. While a section in the plane containing a center axis J1 of the motor 1 (which is also the center axis of a later-described armature 24) is illustrated in FIG. 2, a portion of the configuration positioned behind the plane of the section is also illustrated by broken lines.

As indicated in FIG. 2, the motor 1 is provided with a stator unit 2 and a rotor unit 3 via a bearing mechanism using hydrodynamic pressure generated by lubricating oil, and the rotor unit 3 is supported rotatably on the stator unit 2 with the center axis J1 as center. For convenience in the following description, the rotor unit 3 side along the center axis J1 will be described as an upper portion and the stator unit 2 side as the bottom portion, but the center axis J1 need not necessarily coincide with the direction of gravity.

The rotor unit 3 is provided with a rotor hub 31 which retains the different parts of the rotor unit 3, and a rotor magnet 34 which is arranged to encircle the center axis J1 and is attached to the rotor hub 31. The rotor hub 31 is formed of stainless steel or other suitable metal, and is provided with a cylindrical shaft 311 which protrudes downward (i.e., toward the stator unit 2) about the center axis J1, a circular section 312 arranged perpendicularly with respect to the center axis J1 at the upper end portion of the shaft 311, and a cylindrical section 313 which protrudes downward along the rim of the circular plate section 312. A substantially circular thrust plate 314 is attached to a bottom end portion of the shaft 311.

The stator unit 2 is provided with a baseplate 21 (the base portion of the motor 1) which retains the different parts of the stator unit 2, a cylindrical sleeve unit 22 in which the shaft 311 of the rotor unit 3 is inserted and which is a portion of the bearing mechanism that rotatably supports the rotor unit 3, and an armature 24 which is attached to the baseplate 21 along an outer peripheral surface of the sleeve unit 22. The baseplate 21 is a portion of the first housing component 611 (see FIG. 1) and is formed unitarily with other portions of the first housing component 611 by press-working an aluminum, aluminum-alloy, or magnetic or non-magnetic ferrous-metal sheet material. The armature 24 generates a rotational force (torque) about the center axis J1 between itself and the rotor magnet 34 disposed surrounding circumferentially the shaft 311.

The armature 24 is attached along the upper side of the baseplate 21 by press-fitting or by an adhesive, and is provided with a core 4 formed by laminating a plurality of core plates 5 (four plates are laminated in this preferred embodiment of the present invention), and with a plurality of coils 242 provided in predetermined locations on the core 4.

As indicated in FIG. 2, a cylindrical sleeve attachment portion 216 of the baseplate 21 protrudes upward from a central portion of the baseplate in a direction toward the rotor unit 3 and is centered about the central axis J1. As illustrated in FIG. 2, the sleeve unit 22 is provided with a cylindrical sleeve 221 into which the shaft 311 is inserted centered about the center axis J1, and with a cylindrical sleeve housing 222 attached to the outer periphery of the sleeve 221. The sleeve unit 22 is inserted into the sleeve attachment portion 216 to attach the sleeve unit 22 to the baseplate 21.

The sleeve 221 is inserted into the sleeve housing 222 leaving a slight space between the sleeve 221 and a housing inner surface (i.e., the sleeve is inserted with a clearance fit), and is fixed to the sleeve housing 222 via an adhesive. The sleeve 221 is preferably made of a porous material formed by placing a powdered starting material into a mold, press-hardening the material to pressure-mold the material, sintering the compact, and placing the sintered compact again into a mold to compress the compact into final form. Various kinds of metal powders, powders of metallic compounds, powders of non-metallic compounds, etc. may be used as the starting material for forming the sleeve 221. For example, a blend of iron (Fe) and copper (Cu) powders; a blend of copper and tin (Sn) powders; a blend of copper, tin and lead (Pb) powders; or a blend of iron and carbon (C) powders may be used.

A flange portion 224 of the sleeve housing 222 is formed along the outer periphery of the sleeve unit 22 integral with the housing upper portion as a protrusion that protrudes outward with respect to the center axis J1. The opening along the lower end of the sleeve unit 22 is enclosed by a circular sealing cap 23.

The baseplate has a plurality of through holes 211 (nine through holes 211 in this preferred embodiment of the present invention) axially penetrating therethrough and surrounding the sleeve-attachment portion 216 (an area where the through holes 211 are arranged corresponds to the positions where the later-described teeth 41 are arranged). In a state in which the armature 24 is attached to the baseplate 21, bottom portions of the coils 242 are accommodated in the through holes 211 without protruding downwardly from an undersurface of the baseplate 21. By virtue of this configuration, the height of the motor 1 is reduced without making the baseplate 21 excessively thin.

The through holes 211 which accommodate the bottom portions of the coils 242 are filled with the adhesive such that the coils 242 are fixed to the baseplate 21 and the through holes 211 are closed. In addition, a sheet-like sticker member 212 (e.g., a flexible printed circuit or a name plate) is attached to the lower surface of the baseplate 21 to cover the through holes 211 from the bottom. The sticker member 212 has a substantially circular shape centered about the center axis J1, and is adhered to the lower surface of the baseplate 21 with an adhesive layer.

Next, a bearing mechanism using hydrodynamic pressure to rotatably support the rotor unit 3 relative to the stator unit 2 in the motor 1 will be described. As illustrated in FIG. 2, micro-gaps are provided in the motor 1 in between the lower surface of the circular plate section 312 of the rotor hub 31 and the top surface of the sleeve housing 222; in between the inner surface of the sleeve 221 and the outer surface of the shaft 311; in between the bottom surface of the sleeve 221 and the upper surface of the thrust plate 314; in between the lower surface of the thrust plate 314 and the upper surface of the sealing cap 23; and in between an outer surface of the flange portion 224 of the sleeve housing 222 and an inner surface of the cylindrical section 313 of the rotor hub 31. Lubricating oil continuously fills the micro-gaps between the rotor hub 31, sleeve unit 22, and the sealing cap 23 without interruption, whereby a fully filled bearing mechanism is provided.

An inclined surface is formed on the outer surface of the flange portion 224 of the sleeve housing 222 where the housing gradually decreases in outer diameter as it extends downward. The cylindrical section 313 of the rotor hub 31 is formed so that its inner surface, which opposes the outer surface of the flange portion 224, is of a constant diameter. By this configuration the boundary surface of the lubricating oil in the gap between the flange portion 224 and the cylindrical section 313 forms a meniscus by capillary action and surface tension defining a taper seal, whereby the gap functions as an oil buffer preventing an outflow of the lubricating oil.

On the upper surface of the sleeve housing 222 and on the bottom surface of the sleeve 221, grooves are arranged in a spiral shape (for example) for developing pressure in the lubricating oil directed toward the center axis J1 when the rotor unit 3 spins, wherein thrust dynamic-pressure bearing sections are defined by the end surfaces mentioned above and the opposing surfaces thereto.

Additionally, grooves (e.g., herringbone grooves) are provided on the upper and lower portions of the inner surface of the sleeve 221 and/or the outer surface of the shaft 211 for developing hydrodynamic pressure in the lubricating oil, wherein a radial dynamic-pressure bearing section is defined by these surfaces opposing each other.

In the motor 1, the fact that the rotor unit 3 is supported in a non-contact manner via the lubricating oil by the hydrodynamic pressure bearing mechanism enables the rotor unit 3 to spin with high precision and low noise. In particular, because air will not come into the bearing interior in the hydrodynamic bearing mechanism, abnormal contact between the shaft 311 and the sleeve 221 caused by air bubbles produced within the lubricating oil, and lubricating oil leakage and similar problems due to the expanding of air in the internal portion of the bearing are reduced. In addition, since the sleeve 221 is a porous component pressured-molded from a powdered starting material, the lubricating oil is retained in the bearing mechanism, and particles and other impurities within the lubricating oil are absorbed which keeps the lubricating oil clean.

In this way, the gaps formed in the sleeve unit 22 (i.e., the sleeve 221 and the sleeve housing 222), the rotor hub 31, and the sealing cap 23 are charged with the lubricating oil. Thus, when the rotor portion 3 is spinning, hydrodynamic pressure is used to support the rotor portion 3 through the lubricating oil. Spinning the rotor unit 3 on the stator unit 2, with the center axis J1 as the center, spins the recording disk 62 (see FIG. 1) attached to the rotor unit 3.

Figure 3:
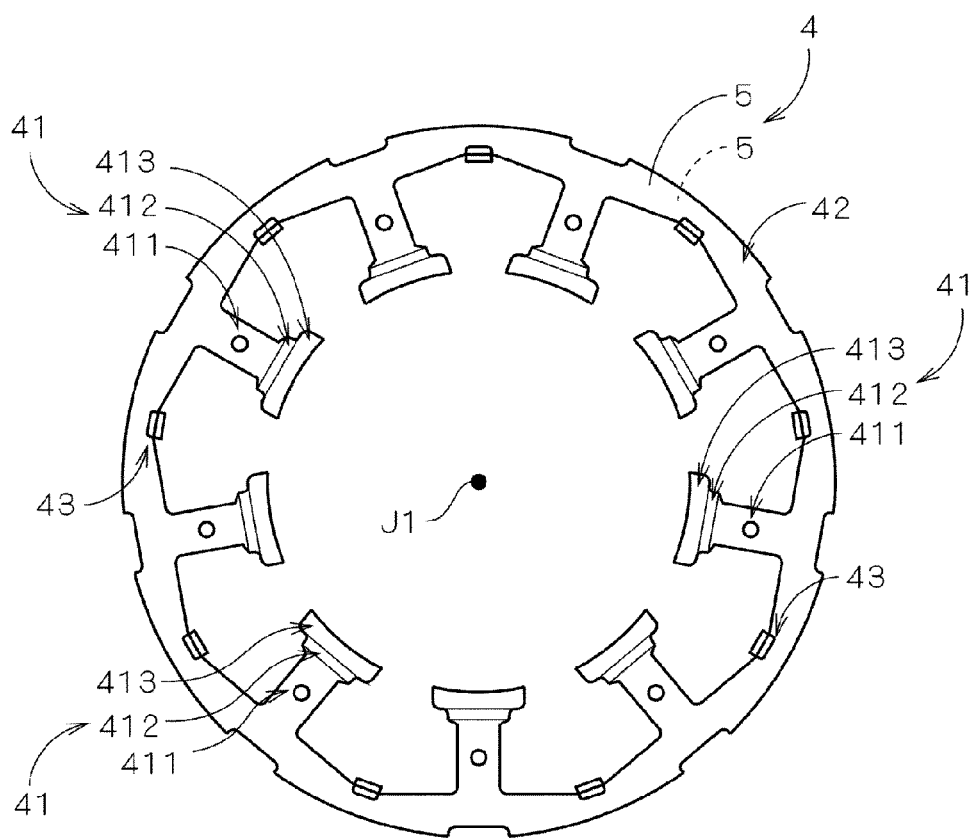
FIG. 3 is a planar view illustrating a core according to a preferred embodiment of the present invention.

Next, the armature 24 according to a preferred embodiment of the present invention will be described. FIG. 3 is a planar view illustrating the core 4. As previously described, the core 4 is formed by laminating a plurality of core plates 5. In FIG. 3, only the core plate 5 arranged on top is illustrated, and the broken lead line indicates that other laminated core plates 5 are arranged below the top plate 5.

The core 4 is provided with a plurality of teeth 41 which are arranged radially about the center axis J1, and with an annular support ring 42 which supports the plurality of teeth 41 along the outer circumferential surface thereof (i.e., supports the plurality teeth 41 by linking the end portions of each of the teeth 41 farther away from the center axis J1). Each of the teeth 41 includes a first wire-wound portion 411 around which a wire of the coil 242 (see FIG. 2) is wound, a first tip portion 413 arranged closest to the center axis J1, and a first connecting portion 412 which is arranged between and magnetically connects the first wire-wound portion 411 and the first tip portion 413. The first tip portion 413 has a greater width in a circumferential direction than a width of the first wire-wound portion 411. The first connecting portion 412 is bent such that the first wire-wound portion 411 and the first tip portion 412 are arranged at axially different levels. In FIG. 3, portions where the teeth 41 are bent are illustrated by thin lines (in the same manner as in FIGS. 4, 7B, 7D, 10, 11, 13, 14A, and 14B).

Figure 4:
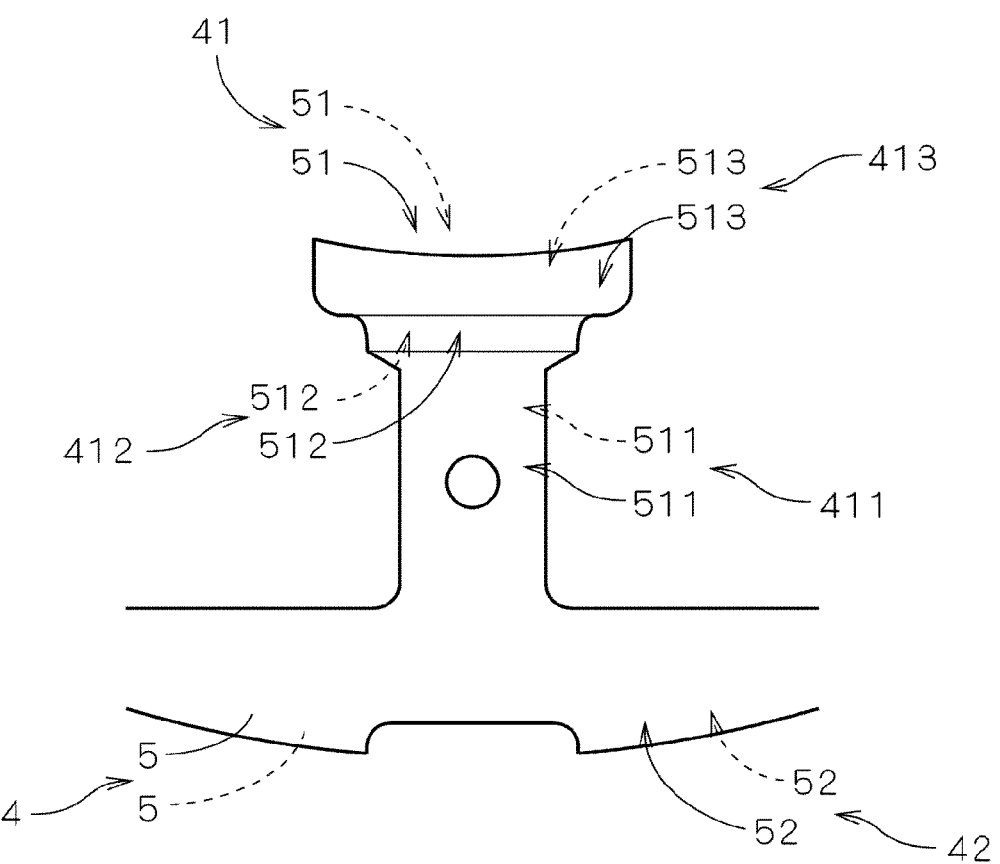
FIG. 4 is a magnified view illustrating a tooth of the core.
Figure 5:
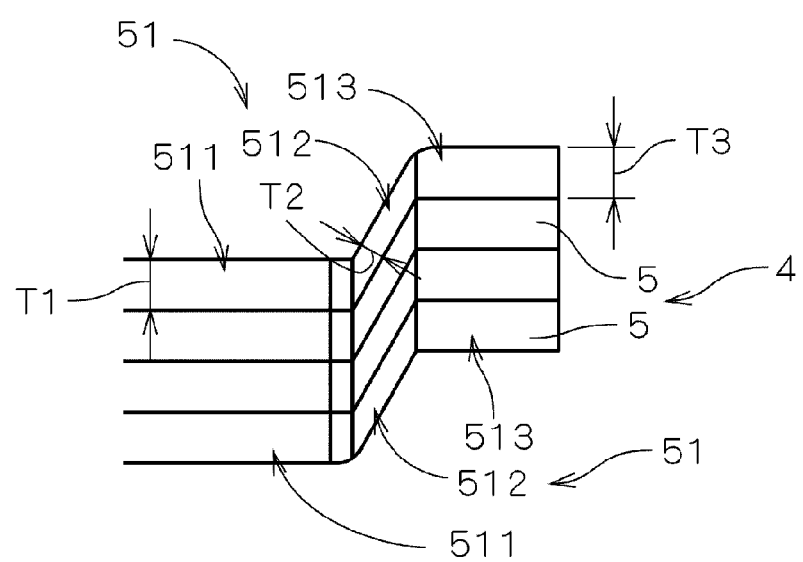
FIG. 5 is a side view illustrating the teeth of the core.

FIG. 4 is a magnified view illustrating one of the teeth 41, and FIG. 5 is a side view of one of the teeth 41 which is illustrated in FIG. 4.

The core 4 is formed by laminating the core plates 5 which have substantially the same shape as each other except at the wire-retaining portions 43, described later. Each core plate 5 includes tooth portions 51 which define the teeth 41 when laminated, and an annular supporting ring portion 52 which defines the supporting ring 42 when laminated. Each of the tooth portions 51 includes a second wire-wound portion 511 which defines the first wire-wound portion 411 when laminated, a second tip portion 513 which defines the first tip portion 413 when laminated, and a second connecting portion 512 which defines the first connecting portion 412 when laminated. Thus, a plurality of the tooth portions 51 of the laminated core plates 5 define the teeth 41 of the core 4, and a plurality of the supporting ring portions 52 of the laminated core plates 5 define the supporting ring 42 of the core 4.

As illustrated in FIG. 4, the second connecting portion 512 has a width greater than that of the second wire-wound portion 511 but smaller than a width of the second tip portion 513. In this preferred embodiment of the present invention, the width of the second connecting portion 512 is about 1.4 or more times greater than the width of the second wire-wound portion 511. The width of a portion of the second wire-wound portion 511 adjoining to the second connecting portion 512 gradually expands toward the second connecting portion 512.

As illustrated in FIG. 5, the second tip portion 513 and the second wire-wound portion 511 are arranged at axially different levels in the axial direction and are substantially perpendicular to the center axis J1. The second connecting portion 512 is arranged between and connects the second tip portion 513 and the second wire-wound portion 511, and is inclined relative to the center axis J1. In each of the core plates 5, a plurality of the tooth portions 51 and the supporting ring portion 52 are formed unitarily, and thus a plurality of the teeth 41 and the supporting ring 42 of the core 4 are formed in a magnetically connected manner (see FIG. 3).

The armature 24 according to this preferred embodiment of the present invention includes nine coils 242 formed by winding wires around nine teeth 41 of the core 4 (see FIG. 2). The wire preferably has a diameter from about 0.05 mm to about 0.3 mm (more preferably about 0.1 mm) and is wound in double-layers on each of the teeth 41. As depicted above, the six coils 242 are connected in a star configuration (Y configuration) and the motor 1 is driven by a three phase AC power supply. Thus, the wire is wound around every third tooth (see FIG. 2). A bridging wire supporting portion 43 is arranged between each of coils 242 to support the wire between the teeth 41 (hereinafter simply referred to as bridging wire 2421). The first tip portions 413 of the armature 24 are arranged so as to radially face the rotor magnet 34, and by virtue of this configuration, torque is generated between the armature 24 and the rotor magnet 34.

Figure 6:
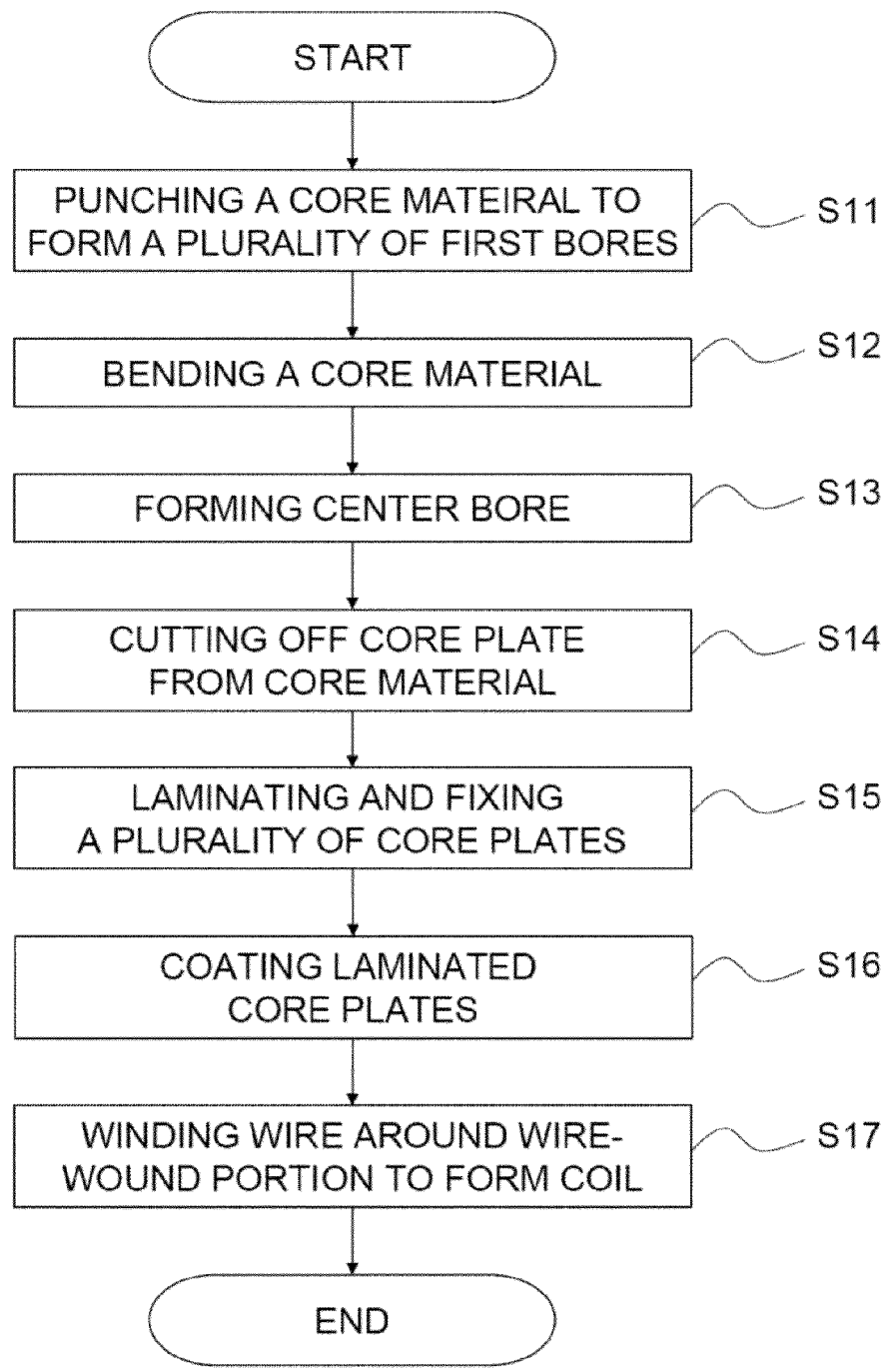
FIG. 6 is a chart setting forth a process flow in the manufacture of an armature.

Next, a method of manufacturing the armature 24 will be described. FIG. 6 is a chart setting forth a process flow in the manufacture of the armature 24. FIGS. 7A to 7D are views illustrating the core plate during the manufacturing process thereof. Manufacturing of the armature 24 starts with a step of preparing the core plate 5 used for the core 4 of the armature 24. Specifically, the following steps are preferably performed on a silicon steel plate (hereinafter referred to as a core material 8). A core material center corresponds to the center axis J1 of the armature 24 and is also referred to as the center axis J1.

Figure 7A:
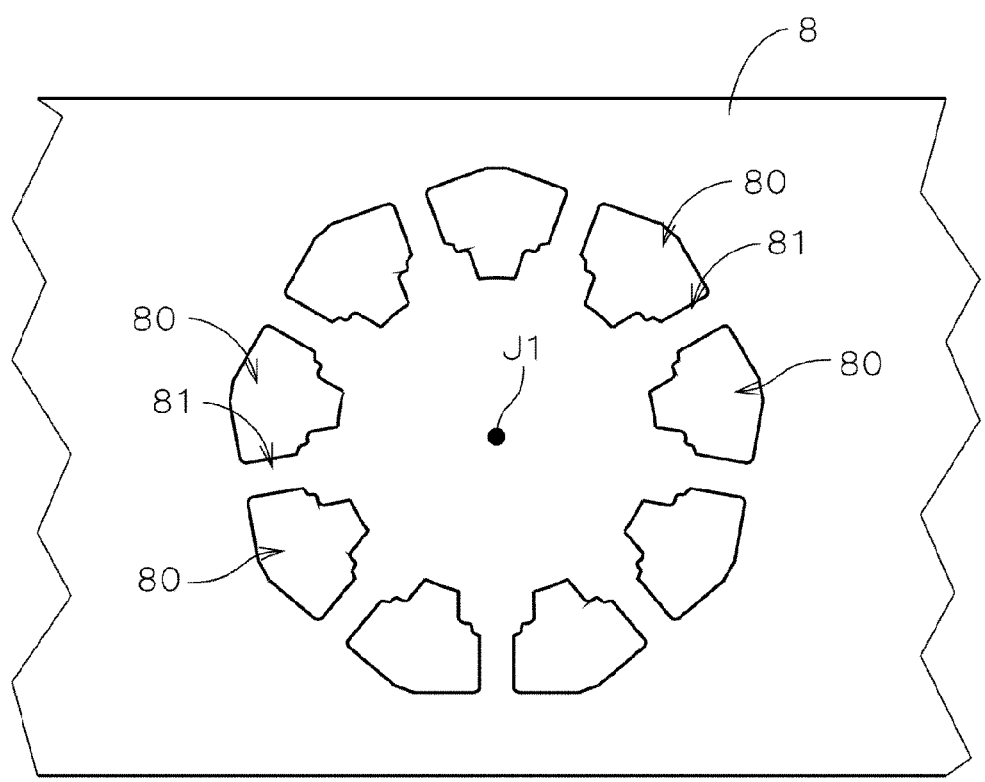
FIG. 7A is a view illustrating a core plate during a manufacturing process thereof.

Firstly, as shown in FIG. 7A, a plurality of first bores 80, arranged along the circumferential direction centered about the center axis J1, are formed in the core material 8 preferably by a punching process (Step S11).

A portion sandwiched circumferentially between neighboring first bores 80 is to be the tooth portion 51 of the core plate 5 and is referred as a preparatory tooth portion 81. Accordingly, an interval width of neighboring first bores 80 in the circumferential direction corresponds to the width of the tooth portion 51. Hereinafter, a portion of the core material 8 corresponding to the second wire-wound portion is referred as a preparatory wire-wound portion, a portion of the core material 8 corresponding to the second connecting portion 512 is referred as a preparatory connecting portion, and a portion of the core material 8 corresponding to the second tip portion 513 is referred as a preparatory tip portion. In this preferred embodiment of the present invention, a form of the first bores 80 is configured such that a width of the preparatory tip portion in the circumferential direction is greater than the width of the preparatory tooth portion 81. A portion radially outside a plurality of first bores 80 corresponds to the supporting ring 52 of the core plate 5 (e.g., a preparatory supporting ring portion).

Next, bending work is performed on the core material 8 on which the punching work is performed such that the preparatory tip portion and the preparatory wire-wound portion of the core material 8 are arranged at axially different levels in the axial direction (Step S12).

Figure 8A:
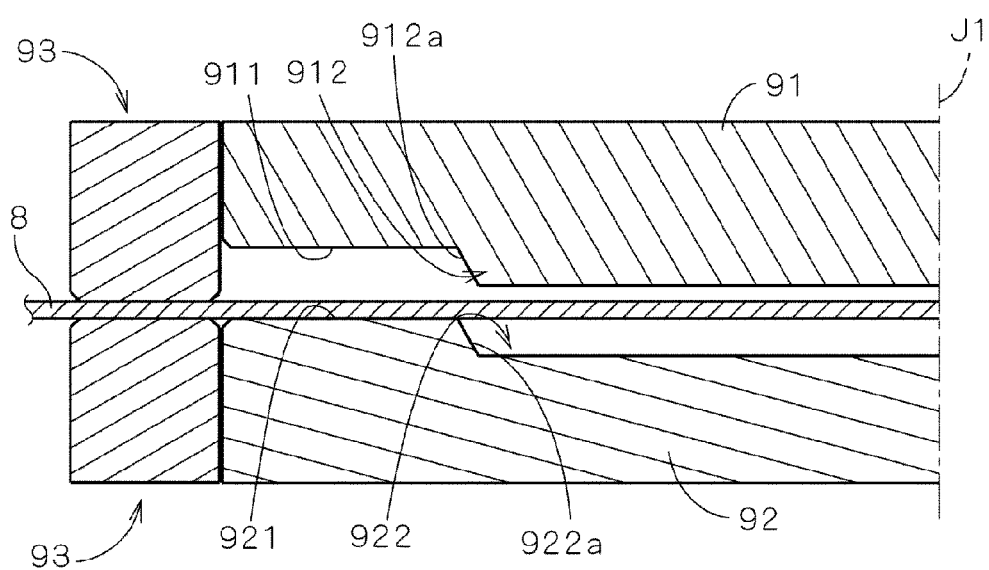
FIG. 8A is a view illustrating a core material during a bending process thereof.
Figure 8B:
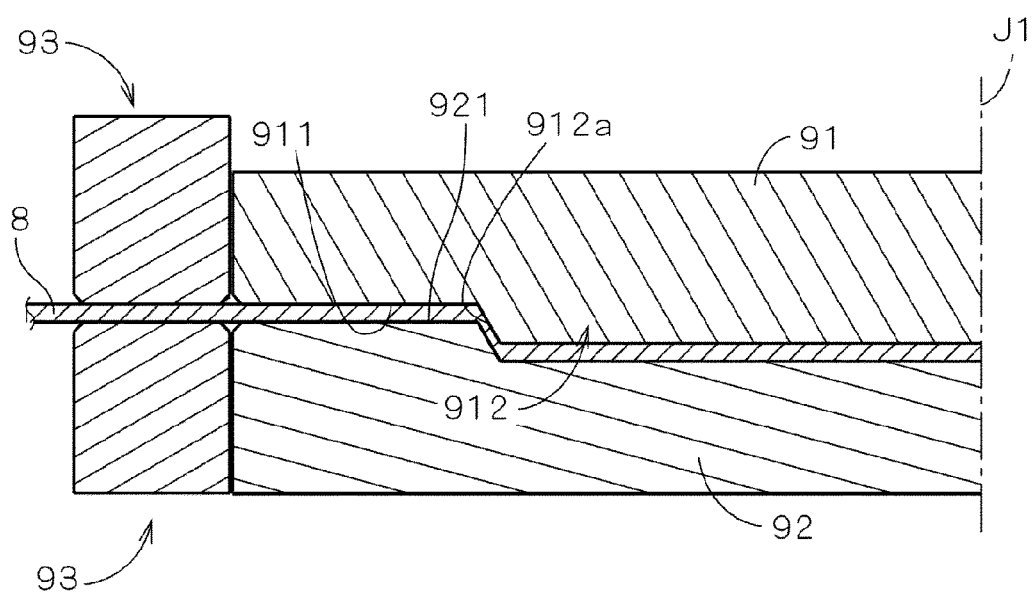
FIG. 8B is another view illustrating the core material during the bending process thereof.

FIGS. 8A and 8B are views illustrating the core material 8 during the bending process thereof.

As illustrated in FIG. 8A, the punched core material 8 is placed between an upper jig 91 and a lower jig 92 axially opposing each other. The upper jig 91 and the lower jig 92 have an annular shape centered about the center axis J1 in a state in which the punched core material 8 is placed therebetween. A lower surface 911 of the upper jig 91 includes a convex portion 912 which has a substantially truncated conical shape, protruding downwardly and centered about the center axis J1. An upper surface 921 of the lower jig 92 includes a concave portion 922 which is arranged to axially oppose the convex portion 912. As illustrated in FIG. 8A, the convex portion 912 decreases gradually in outer diameter heading downward (e.g., a first inclined surface 912a is formed on an outer surface of the convex portion 912), and the concave portion 922 gradually decreases in outer diameter heading downward (e.g., a second inclined surface 922a is formed on an outer surface of the concave portion 922). A retainer 93 retains a radially outer surface of the core material 8 such that a lower surface of the core material 8 abuts against the upper surface 921 of the lower jig 92. The punched core material 8 is arranged such that the preparatory wire-wound portion is arranged on the upper surface 921 of the lower jig 92 and the preparatory tip portion is arranged on the convex portion 912 of the upper jig 91.

After the core material 8 is appropriately placed in the above described manner, the upper jig 91 moves toward the lower jig 92, and a portion of the core material 8 arranged below the convex portion 912 is pressed against the lower jig 92 and is bent. When the core material 8 is pressed and bent, a portion of the core material 8 arranged below the first inclined surface 912a is drawn. As illustrated in FIG. 8B, the upper jig 91 moves toward the lower jig 92 until the axial distance between the upper and lower jigs become substantially the same as an axial thickness of the core material 8. By virtue of the processes mentioned above, the core material 8 is bent such that the preparatory tip portion and the preparatory wire-wound portion are arranged at axially different levels in the axial direction. In addition, the portion of the core material 8 arranged axially between the first inclined surface 912a and the second inclined surface 922a (e.g., the preparatory connecting portion) is bent such that the preparatory connecting portion is inclined relative to the center axis J1. It should be noted that the upward and downward directions in the FIGS. 8A and 8B may not correspond to those of other the figures. For example, the lower surface of the core material 8 illustrated in FIG. 8B corresponds to the upper surface of the core plate 5 illustrated in FIGS. 2 to 5.

Figure 7B:
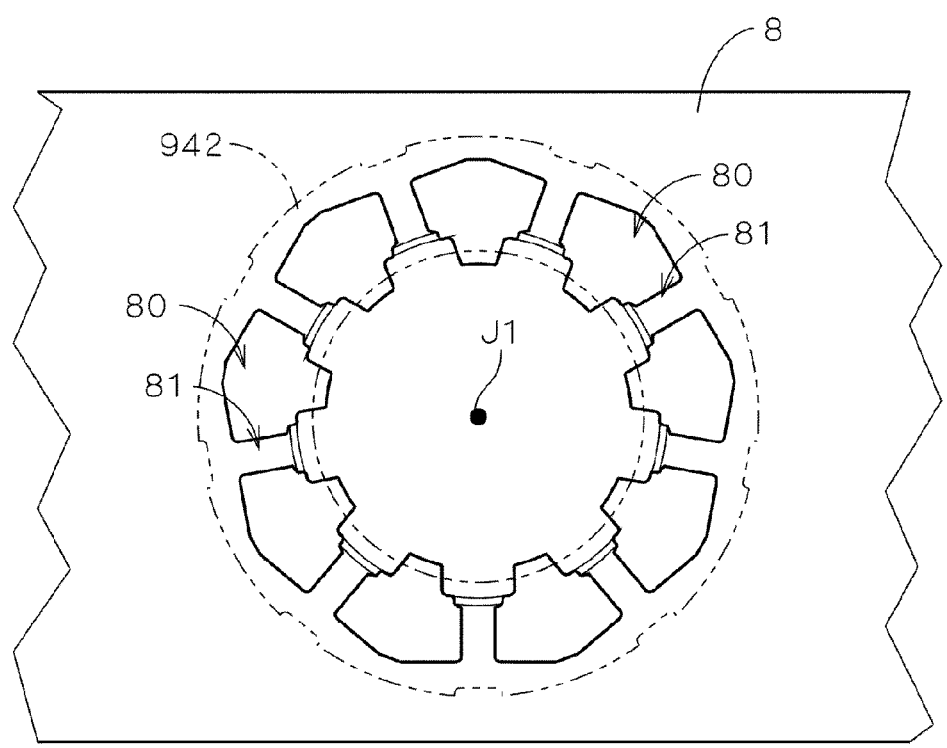
FIG. 7B is another view illustrating the core plate during the manufacturing process thereof.
Figure 7C:
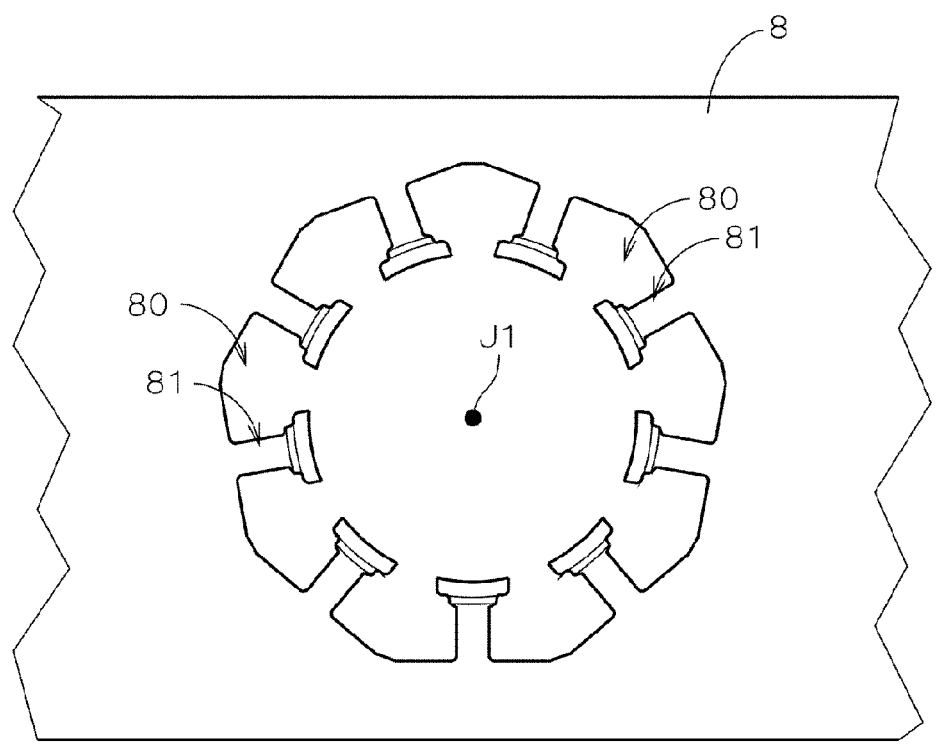
FIG. 7C is another view illustrating the core plate during the manufacturing process thereof.
Figure 7D:
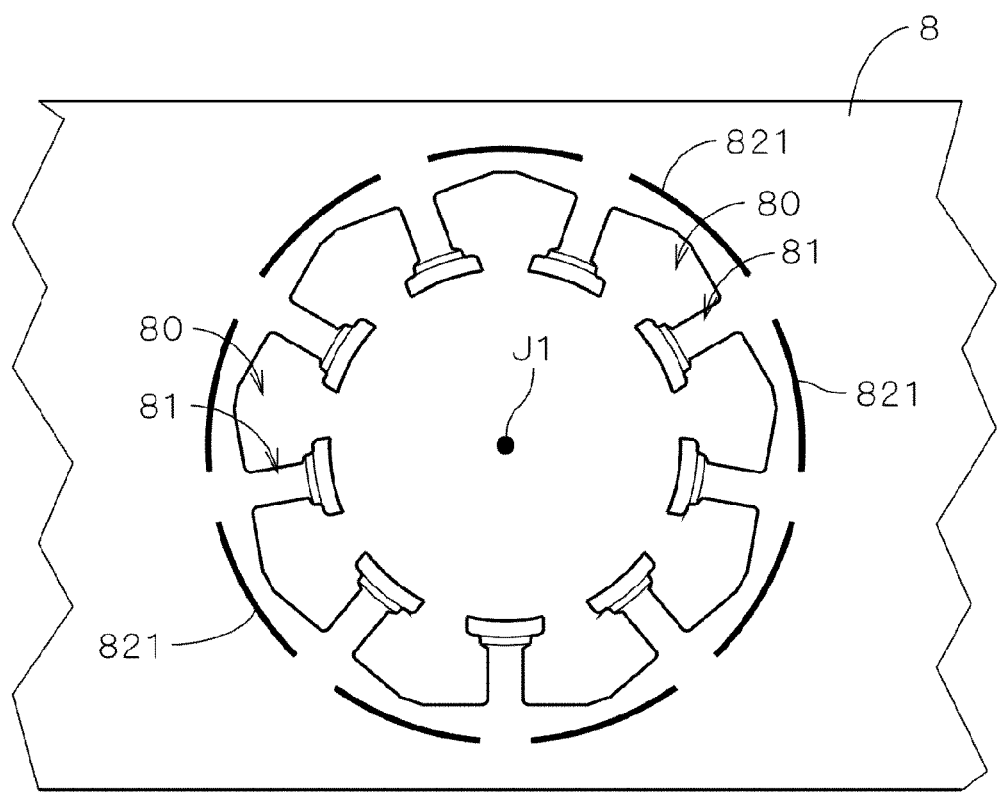
FIG. 7D is another view illustrating the core plate during the manufacturing process thereof.

FIG. 7B is a view illustrating the core material 8 after the punching and bending work is performed thereon. As illustrated in FIG. 7B, the width of the preparatory connecting portion in the circumferential direction is greater than that of the preparatory wire-wound portion but narrower than that of the preparatory tip portion.

Figure 9A:
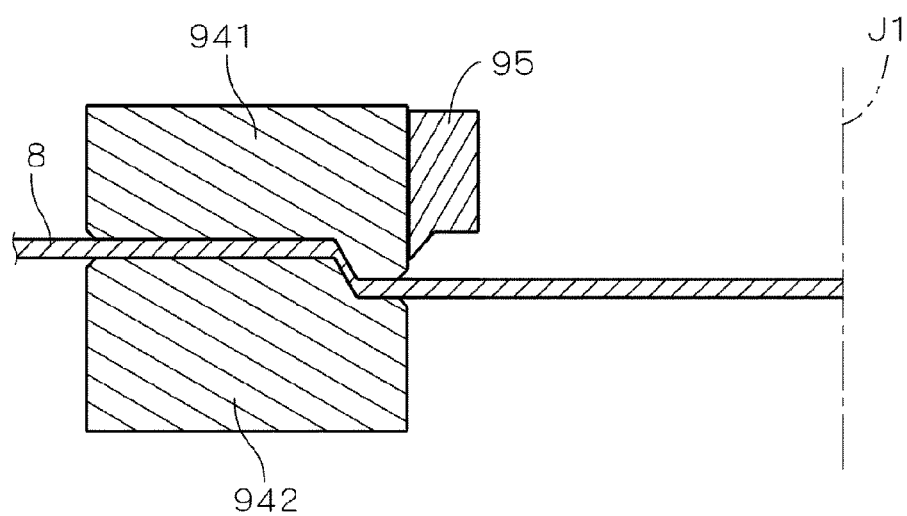
FIG. 9A is a view illustrating the core material during a cutting process to form an inner tip portion of the tooth.
Figure 9B:
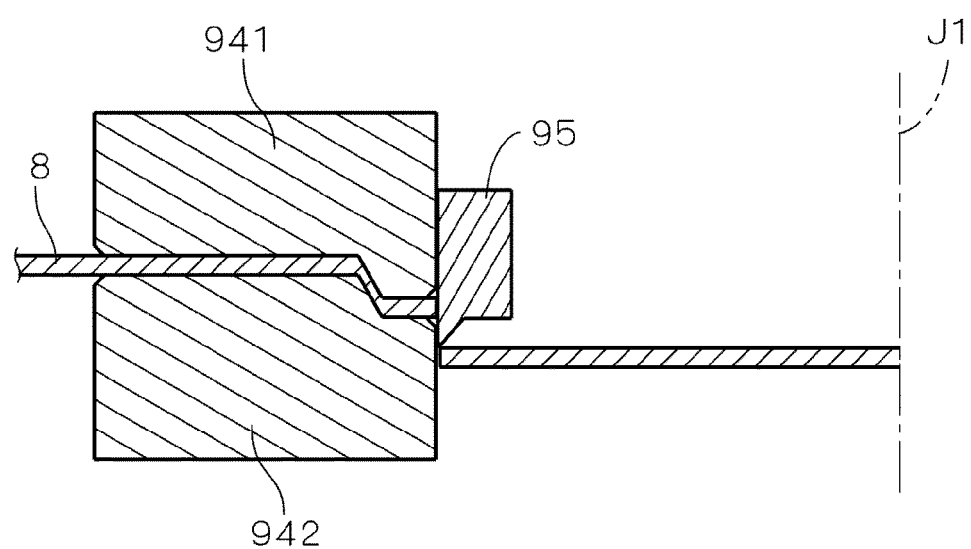
FIG. 9B is another view illustrating the core material during the cutting process to form an inner tip portion of the tooth.

Next, center-hole boring work is performed on the core material such that a center bore centered about the center axis J1 is provided therein. In the boring work, the preparatory supporting ring portion 52 of the punched-and-bent core material 8 is supported in an axially sandwiched state between an upper annular member 941 and a lower annular member 942. The upper and lower annular members have a concentric form centered about the center axis J1 and substantially the same inner and outer diameter. In FIG. 7B, the lower annular member 942 is illustrated by a chain double-dashed line. Then, as shown in FIG. 9B, a circular area of the core material 8 centered about the center axis J1 is punched with a punching die 95 having an annular shape along the inner circumferential surface of the upper annular member 941 (Step S13). Thus, a portion corresponding to the second tip portion 513 is formed.

Figure 10:
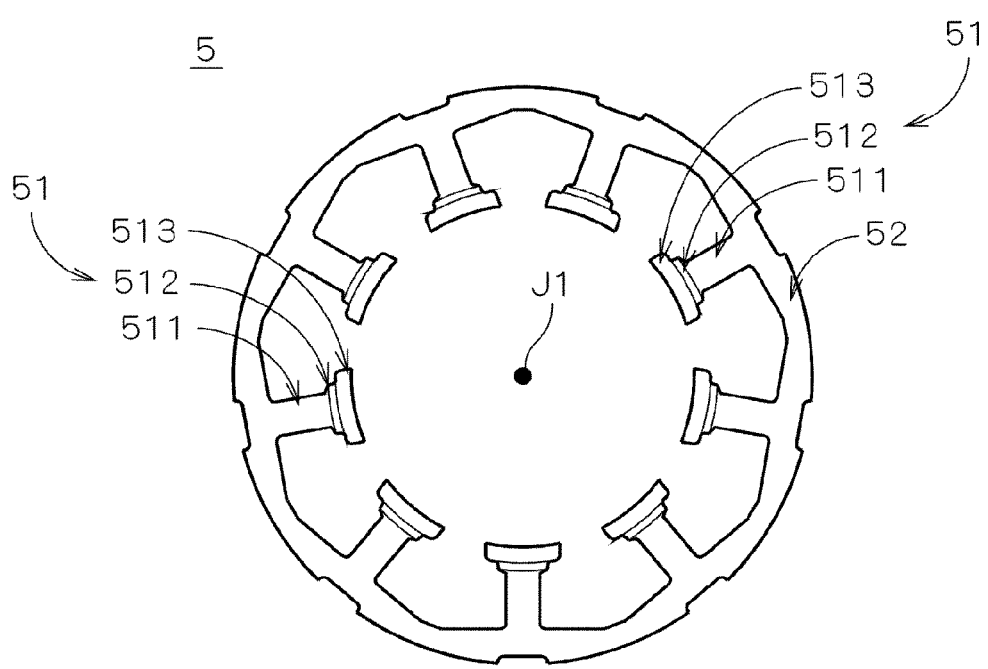
FIG. 10 is a planar view illustrating a core plate according to a preferred embodiment of the present invention.

After the boring work, a plurality of slots 821 having an arc shape centered about the center axis J1 is formed in the core material 8. The slots 821 are arranged at portions radially outside and between neighboring preparatory tooth portions 81. The slots 821 correspond to a portion of an outer circumference of the supporting ring portion 52. Then, the core material 8 is cut with a suitable die so as to connect slots 821 into a circular shape (Step S14), and the core plate 5 as illustrated in FIG. 10 is formed.

It should be noted that it is not depicted in FIG. 6 that the Steps S11 to S14 are repeated to form a plurality of core plates 5.

Then, a predetermined number of core plates 5 (four core plates 5 in this preferred embodiment of the present invention) are laminated and preferably fixed to each other by caulking (Step S15). However, the plurality of core plates 5 may be fixed by any other suitable method (i.e., laser welding, bonding, and adhering, etc.).

One of the core plates 5 has a protruding portion which protrudes radially inwardly and is formed by the punching work to form the first bores 80. The protruding portion is bent and formed into the wire bridging portion 43 (see FIGS. 2 and 3). Then, the laminated core plates 5 are coated with an insulating material (e.g., an insulating resin) by electrodeposition, powder coating, and the like to form the core 4 (Step S16). The core 4 may be formed by laminating the plurality of core plates 5 each of which is coated with insulating material beforehand.

Subsequently, the wire is wound around the wire-wound portions 411 with a wire winding machine to form a coil 242 on each of the teeth 41 (Step S17), and manufacturing of the armature 24 is completed.

As described above, the core 4, used for the motor 1 having the rotor magnet arranged radially inside the armature 24 (e.g., an inner rotor type motor), having the plurality of teeth 41 and the supporting ring 42, is formed by laminating the core plates 5. Each tooth portion 51 of the core plate 5 includes the second tip portion 513, the second wire-wound portion 511 arranged at a level axially different from that the second tip portion 513, and the second connecting portion 512 arranged radially between and magnetically connecting the second tip portion 513 and the second wire-wound portion 511.

In manufacturing of the armature 5, the preparatory connecting portion is drawn in the axial direction. Thus, as illustrated in FIG. 5, a thickness T2 of the second connecting portion 512 gets thinner than a thickness T1 of the second wire-wound portion 511 and a thickness T3 of the second tip portion 513. In the core plate 5 manufactured according to the present preferred embodiment of the present invention, the thickness T2 is about 0.6 of the thickness T1 and T3. Table 1 depicts actual measurements of the thicknesses T1, T2, and T3. In Table 1, numbers 1 to 5 indicated on the leftmost column represent core plate numbers assigned to each of the core plates 5, and a thickness ratio (%) is obtained by comparing the average thicknesses of T1, T2, and T3 with that of T1.

TABLE 1

|  | T1 | T2 | T3 |
| --- | --- | --- | --- |
| 1 | 0.1982 | 0.1115 | 0.1001 |
| 2 | 0.1940 | 0.1089 | 0.1951 |
| 3 | 0.1886 | 0.1044 | 0.1892 |
| 4 | 0.1955 | 0.1066 | 0.1874 |
| 5 | 0.2077 | 0.1182 | 0.1949 |
| Average | 0.1968 | 0.1099 | 0.1733 |
| Ratio | 100% | 56% | 88% |

Figure 11:
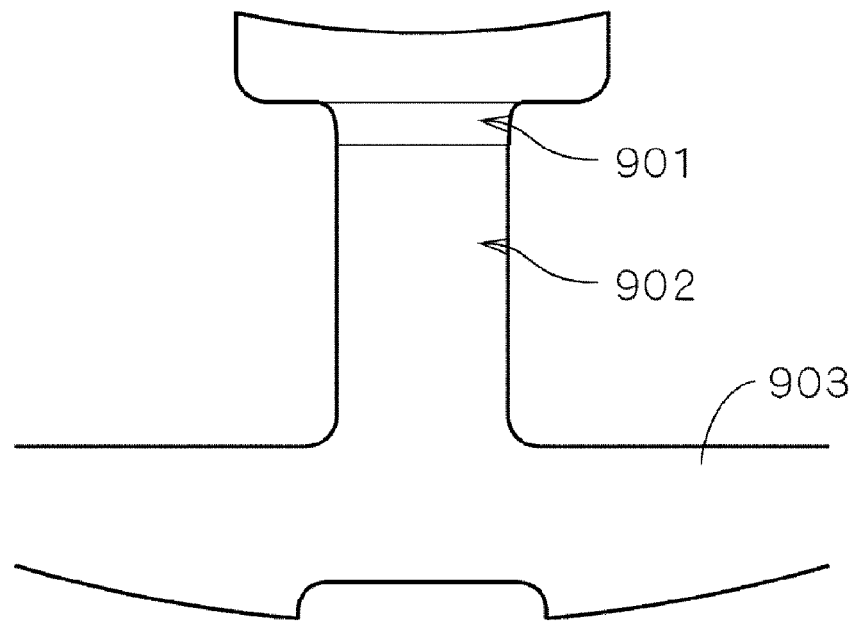
FIG. 11 is a magnified view illustrating a conventional tooth of a conventional core.

As depicted in Table 1, the thickness T2 gets thinner than the thicknesses T1 and T3. Conventionally, as shown in FIG. 11, a tooth portion 904 extending from a ring portion 903 includes a connecting portion 901 having substantially the same width as the wire-wound portion 902. With the conventional connecting portion 901 having substantially the same width as the wire-wound portion 902, magnetic flux saturates at the conventional connecting portion 901. Since magnetic flux is not converted into torque effectively, the efficiency of the motor 1 is degenerated as well (e.g., efficiency of the torque conversion ratio of the magnetic flux is degenerated). Moreover, the conventional connecting portion 901 having a thickness smaller than the other portions may cause vibration and noise of the motor 1 during rotation thereof. This leads to deterioration of the rotational accuracy of the motor 1.

In this preferred embodiment of the present invention, however, the second connecting portion 512 has a greater width than the width of the second wire-wound portion 511 in the circumferential direction. By virtue of this configuration, the magnetic flux does not saturate at the second connecting portion 512 and the core-loss is reduced. Therefore, the motor 1 is efficiently and stably driven with lower power. In addition, since rigidity at the second connecting portion 512 is preferably maintained, the vibration and the noise of the motor 1 are reduced. Therefore, according to the present preferred embodiment of the present invention, the stability and the durability of the motor 1 is increased while reducing the noise of the motor 1.

In this present preferred embodiment, the second connecting portion 512 has an expanded width which is greater than the width of the second wire-wound portion 511, thus, the magnetic flux saturation at the second connecting portion 512 is reduced. For example, in case that the thickness of the second connecting portion 512 is about 0.6 of the thickness of the second wire-wound portion 511 as described in Table 1, making the second wire-wound portion 512 width 1.6 or more times greater than the width of the second wire-wound portion 512 will keep the cross section of the second connecting portion 512 substantially the same as or wider than that of the second wire-wound portion 511. Moreover, the width of the second connecting portion 512 gradually expands toward the second tip portion 513 in this preferred embodiment of the present invention. By virtue of this configuration, the rigidity of the tooth portion 51 radially inward of the tip portion 513 is maintained.

In the recording disk drive device 60 provided with the motor 1, the axial height of the recording disk drive device 60 is reduced while the power consumption thereof is lowered, and the stability and the durability thereof are maintained.

The ratio of the thickness T2 of the second connecting portion 512 to the thickness T1 of the second wire-wound portion 511 may differ from about 0.6 depending on the material or processing method of the core material 8. For example, the ratio of the thickness T2 to the thickness T1 may be about 0.8. In this case, configuring the width of the second connecting portion to about 1.2 or more times greater than the width of the second wire-wound portion 511, the second wire-wound portion 512 will have substantially the same or a wider cross section than that of the second wire-wound portion 511. Therefore, the magnetic flux saturation at the second connecting portion 512 is reduced or prevented.

In manufacturing of the armature 24 of the motor 1 illustrated in FIG. 2, a single core plate 5 may be used as the core 4 of the motor 1. In this case, it is not necessary to perform the Steps S11 to S14 repeatedly. Also, execution of the Step S15 in which a plurality of core plates 5 are laminated is not necessary. After forming a single core plate 5, the core plate 5 is coated with an insulating material by electrodeposition, power coating and the like. Subsequently, the wire is wound around the wire-wound portion 411 of each of the teeth 41 with a wire winding machine to form a plurality of coils 242 (Step S17), and manufacturing of the armature 24 defined by a single core plate 5 is completed. In such an armature defined by a single core plate 5, the connecting portion is configured to have a width in the circumferential direction greater than the width of the wire-wound portion. By virtue of this configuration, the magnetic flux does not saturate at the connecting portion, thus the motor is effectively driven.

As described above, in the armature 24 defined by at least one core plate 5 having the second tip portion 513 and the second wire-wound portion 511 arranged at axially different levels, the magnetic flux saturation at the second connecting portion 512 is preventable by configuring the second connecting portion 512 to have a greater width than that of the second wire-wound portion 511.

Figure 12:
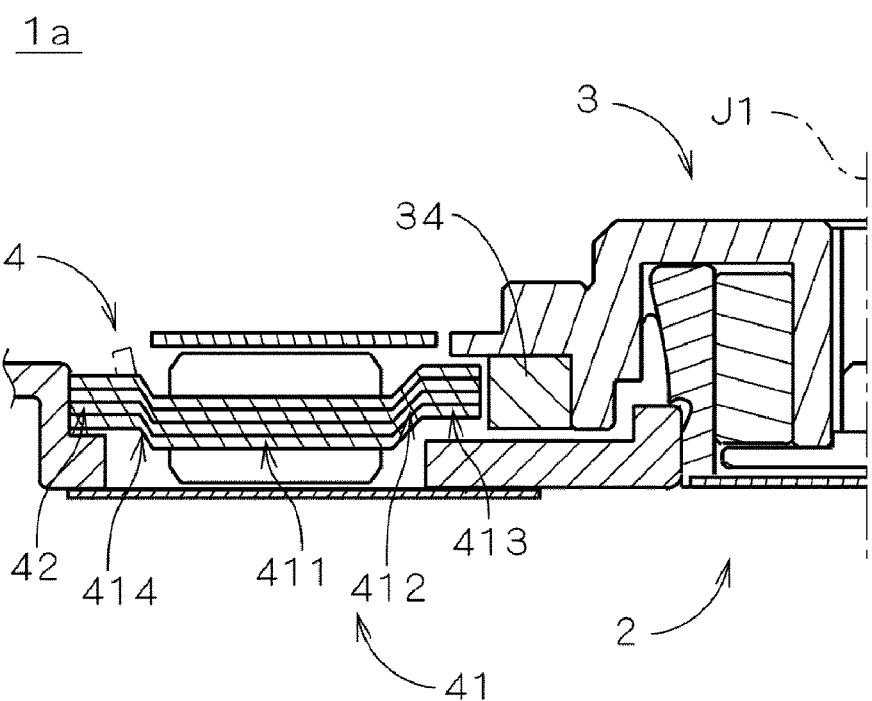
FIG. 12 is a vertical sectional view illustrating a motor according to another preferred embodiment of the present invention.

FIG. 12 is a vertical sectional view illustrating a motor according to another preferred embodiment of the present invention. In the motor 1A illustrated in FIG. 12, the supporting ring 42 and the tip portion 413 of the core 4 are arranged at substantially the same level in the axial direction. In other words, in this preferred embodiment of the present invention, each of the teeth 41 includes the first connecting portion 412 arranged between the first tip portion 413 and the first wire-wound portion 411, and an additional connecting portion 414 arranged between the first wire-wound portion 412 and the supporting ring 42. The first connecting portion 412 and the additional connecting portion 414 are inclined relative to a surface perpendicular to the center axis J1, such that the first wire-wound portion 411 and the first tip portion 413 are arranged at an axially different level. The rest of the configuration of the motor 1A is the same as that illustrated in FIG. 2 and is labeled with the same reference characters in the description that follows.

Figure 13:
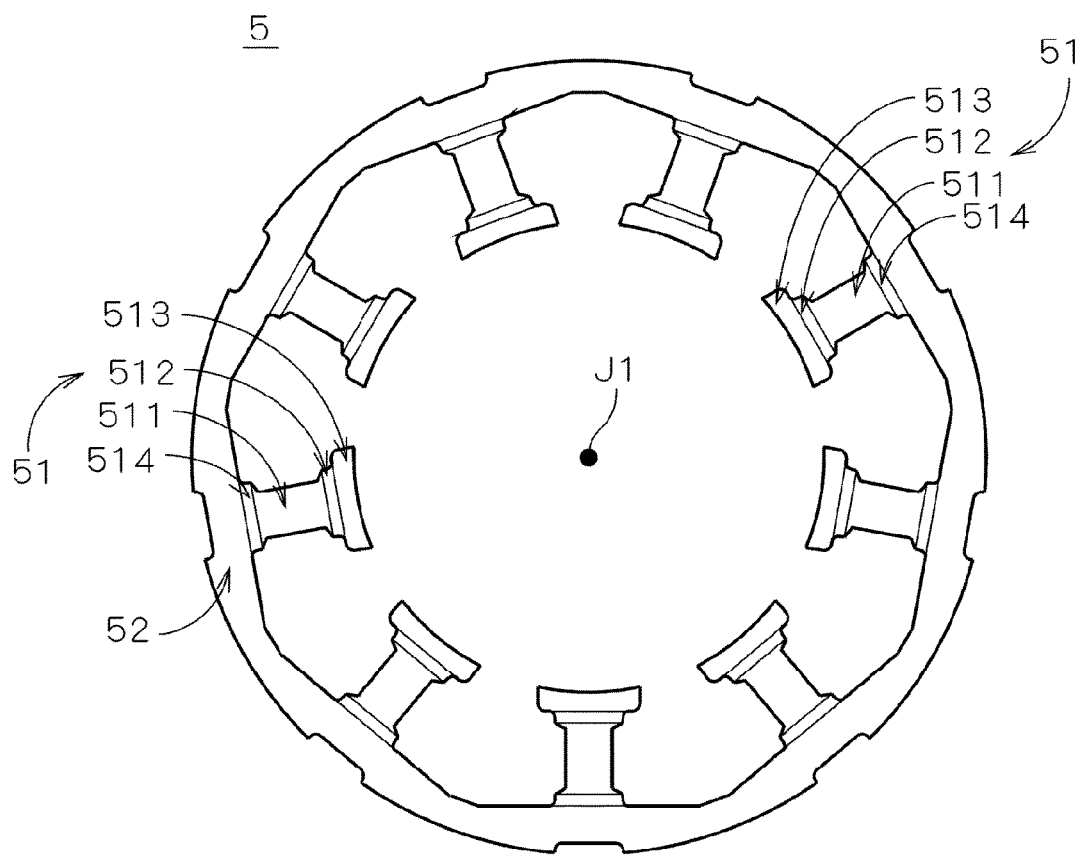
FIG. 13 is a planar view illustrating the core plate.

FIG. 13 is a planar view illustrating the core plate 5 used for the core 4 illustrated in FIG. 12. The core 4 of the motor 1A is made by laminating the core plates 5. Each core plate 5 includes tooth portions 51 which define the teeth 41 when laminated and an annular supporting ring portion 52 which defines the supporting ring 42 when laminated. Each of the tooth portions 51 of the core plate 5 includes the second tip portion 513, the second wire-wound portion 511 arranged at a level axially different from that of the second tip portion 513, the second connecting portion 512 arranged between and magnetically connecting the second tip portion 513 and the second wire-wound portion 511, and the second additional connecting portion 514 arranged between and magnetically connecting the second wire-wound portion 511 and the supporting ring 52. The second connecting portion 512 and the second additional connecting portion 514 are inclined relative to a surface perpendicular to the center axis J1. The second additional connecting portion 514 is formed by performing the press working on the core material 8. Similar to the second connecting portion 512, a portion of the core material 8 corresponding to the second additional connecting portion 514 (preparatory additional connecting portion) is axially drawn during the press working, thus the axial thickness of the preparatory additional connecting portion becomes thinner than that of the second wire-wound portion 511.

In the core plate 5 illustrated in FIG. 13, similar to the second connecting portion 512, the additional connecting portion 514 is configured to have a width in the circumferential direction greater than a width of the second wire-wound portion 511. By virtue of this configuration, the magnetic flux does not saturate at the additional connecting portion 514, thus the motor 1a is effectively driven. Moreover, the width of the additional connecting portion 514 gradually expands toward the supporting ring portion 52. By virtue of this configuration, the rigidity of the tooth portion 51 near a radially outward portion (i.e., a portion of the tooth portion 51 near the supporting ring portion 52) is maintained. However, a core 4 defined by a single core plate 5 may be used for the motor 1a illustrated in FIG. 12.

While preferred embodiments of the present invention have been described in the foregoing, the present invention is not limited to the preferred embodiments detailed above, in that various modifications are possible.

In the preferred embodiments of the present invention described above, the second connecting portion 512 has a width in the circumferential direction greater than a width of the second wire-wound portion 511 but smaller than that of the second tip portion 513. However, the width of the second connecting portion 512 and the second tip portion 513 maybe substantially the same. In other words, the second connecting portion 512 is configured to have a width greater than that of the second wire-wound portion 511, and substantially the same as or smaller than a width of the second tip portion 513.

In the preferred embodiments of the present invention described above, the core plate 5 is preferably manufactured by the following steps: punching to form the first bores 80, pressing the punched core material 8 to bend the portion corresponding to the second connecting portion 512, center-hole boring to form the center bore, and cutting off the core plate 5 from the core material 8. It should be noted, however, some of these process steps may be omitted, or the order of the process steps may be changed. For example, the flat core plate 5 may be cut off from the core material 8, and then the pressing work is performed on the core plate to form the second connecting portion 512. Additionally, a plurality of core materials 8 may be laminated beforehand, and then the Steps S11 to S14 may be performed on the laminated core material 8.

In the preferred embodiments of the present invention described above, the core plate is manufactured by pressing the core material in which the preparatory connecting portion of each of the preparatory tooth portions is drawn and becomes thinner than the wire-wound portion. It should be noted, however, other processing techniques (i.e., bending, drawing, die casting, molding and so on) may be used to manufacture the core plate. The preferred embodiments of the present invention encompass any process in which the connecting portion of the tooth portion becomes thinner than the wire-wound portion through the manufacturing process.

Figure 14A:
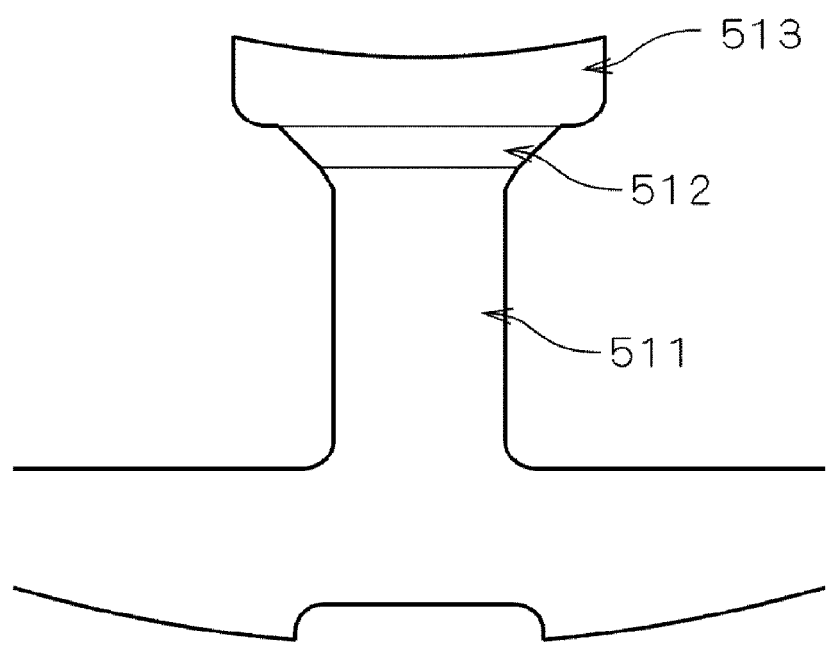
FIG. 14A is a view illustrating a tooth according to another preferred embodiment of the present invention.
Figure 14B:
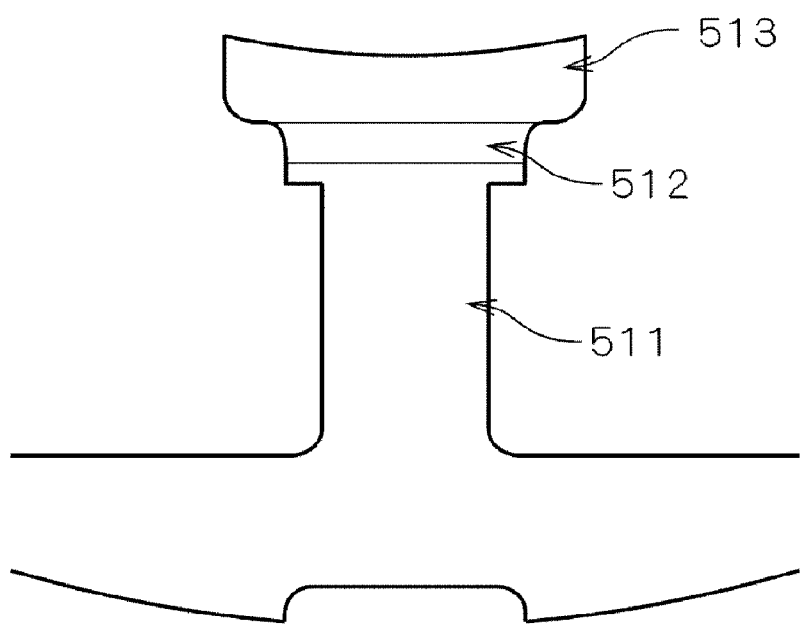
FIG. 14B is a view illustrating a tooth according to yet another preferred embodiment of the present invention.

A form of the tooth portion 51 is not limited to those described above. The second connecting portion 512 of the tooth portion 51 may have a width gradually expanding in the circumferential direction toward the second connecting portion 512, as illustrated in FIG. 14A. Additionally, as illustrated in FIG. 14B, the second wire-wound portion 511 and the second connecting portion 512 may have substantially the same width at their adjacent areas, and the width of the second connecting portion 512 may gradually expand toward the second tip portion 513.

Still another possible modification includes using so-called air-pressure bearings, in which air serves as the working fluid, for the bearing mechanism of the motors 1 and 1a. Yet another possible modification includes a motor according to the preferred embodiments described above as the drive source for other devices apart from hard-disk drives, for example, removable disk devices.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. An armature core of an electric motor comprising:
   a plurality of tooth portions arranged circumferentially about a center axis, and extending in a radial direction;
   a supporting ring portion supporting the plurality of the tooth portions along an outer circumferential surface of the tooth portions;
   a wire-wound portion arranged at each tooth portion and connected to the supporting ring portion;
   a tip portion arranged at an innermost portion of each tooth portion, the tip portion and the wire-wound portion being in axially different positions from each other; and
   a connecting portion connecting the wire-wound portion and the tip portion, the connecting portion having a width in a circumferential direction that is greater than a width of the wire-wound portion but smaller than a width of the tip portion, and the connecting portion is thinner than the wire-wound portion; wherein
   the width of the wire-wound portion expands gradually toward the connecting portion at an end portion of the wire-wound portion; and
   each of the wire-wound portion, the tip portion, and the connecting portion is defined by a laminated body of a plurality of plates, and each of the wire-wound portion, the tip portion, and the connecting portion include the same number of plates.

2. The armature core as set forth in claim 1, wherein a thickness of the connecting portion is about 0.8 times or less of a thickness of the wire-wound portion.

3. The armature core as set forth in claim 2, wherein the width of the connecting portion in the circumferential direction is about 1.2 times or more than the width of the wire-wound portion.

4. An armature of the electric motor comprising:
   the armature core as set forth in claim 1;
   a plurality of coils including wires wound around the plurality of the teeth.

5. An electric motor comprising:
   the armature as set forth in claim 4;
   a stator unit;
   a rotor unit;
   a base portion included in the stator unit and arranged to support the armature;
   a rotor magnet arranged at the rotor unit and arranged to generate torque centered about the center axis with the armature; and
   a bearing mechanism arranged to support the rotor unit rotatably relative to the stator unit; wherein
   the rotor is arranged to rotate with respect to the armature.

6. A recording disk drive device comprising:
   the electric motor as set forth in claim 5;
   a recording disk arranged to store information;
   a head portion arranged to perform at least one of writing information onto and reading information from the recording disk; and
   a head-shifting mechanism arranged to vary a position of the head portion relative to the recording disk.

* * * * *